United States Patent [19]

Massa

[11] 4,050,056

[45] Sept. 20, 1977

[54] ELECTROACOUSTIC TRANSDUCER DESIGN FOR ELIMINATING PHANTOM TARGET ERRORS IN SOUND RANGING SYSTEMS

[75] Inventor: Frank Massa, Cohasset, Mass.

[73] Assignee: Fred M. Dollorfano, Jr. and Donald P. Amassa, Trustees of The Stoneleigh Trust, Cohasset, Mass.

[21] Appl. No.: 630,364

[22] Filed: Nov. 10, 1975

[51] Int. Cl.2 .......................... G01S 9/66; H04R 1/34

[52] U.S. Cl. .................................. 340/1 R; 340/8 FT

[58] Field of Search ................ 340/1, 1 T, 8 FT, 3 E, 340/5 D, 8 R, 9, 13; 181/154, 155; 310/8.2

[56] References Cited

U.S. PATENT DOCUMENTS

| | | | |
|---|---|---|---|
| 2,000,806 | 5/1935 | White | 340/5 D |
| 2,567,407 | 9/1951 | Slaymaker | 340/8 FT |
| 2,844,809 | 7/1958 | Batchelder | 340/8 FT |
| 3,611,276 | 10/1971 | Massa | 340/3 E |
| 3,715,709 | 2/1973 | Zacharias, Jr. et al. | 340/3 E |

OTHER PUBLICATIONS

Sunthankar, *IEEE Trans. Sonics and Ultrasonics,* vol. SU-20, No. 3, July 1973, pp. 274-278.

*Primary Examiner*—Richard A. Farley

[57] ABSTRACT

A baffle structure for use with an electroacoustic transducer in a sound ranging system eliminates secondary reflections between the transducer and target, thus eliminating false target errors that occur in conventional sound ranging systems due to phantom target indications caused by multiple reflections between the transducer and target.

5 Claims, 10 Drawing Figures

ELECTROACOUSTIC TRANSDUCER DESIGN FOR ELIMINATING PHANTOM TARGET ERRORS IN SOUND RANGING SYSTEMS

This invention is concerned with improvements in electroacoustic transducers for use in sound ranging systems for the location of sound reflecting targets, and more particularly with the elimination of false target indication errors that sometimes occur when using ultrasonic transducers for the detection of targets at relatively close range. At close range, the received acoustic signal, after reflection from the target, is strong enough to be reflected again from the transducer face and returned back to the target from which it is reflected a second time and eventually it is received a second time by the transducer at which time it is recognized as a second phantom target located at double the distance from the real target.

For certain echo ranging applications in which a plurality of targets is present within a given area and it is desired to locate and determine the number of targets present, it is obvious that an error will be introduced in the echo ranging data due to the phantom target indication which results when a multiple round-trip reflection occurs between a true target and the nearby face of the sensing transducer, as described above. An example of a practical application of this invention is in an ultrasonic echo ranging system for use in an automatic pin scoring system for bowling games. In such a system, an array of ultrasonic transducers mounted on the wall opposite the pin deck in a bowling lane are employed as echo ranging transducers for ultrasonically locating the number of pins that remain standing after the ball is thrown. The sound ranging signals are electronically processed to instantly display the player's score. The elimination of phantom targets is obviously a necessary requirement for such a system; otherwise an error will be introduced in the scoring data. The electronic processing details of the automatic pin scoring system are not a part of this invention and are therefore not discussed in this application.

The primary object of this invention is to design an electroacoustic transducer for use in locating a sound reflecting target and provided with means for reducing the magnitude of the acoustic signal reflected from the transducer when it is receiving a tone burst signal from the target.

Another object of this invention is to improve the design of an electroacoustic transducer and baffle system for use in an echo ranging system for the location of a sound reflecting target whereby multiple reflections of an acoustic tone burst signal between the face of the transducer and the surface of the target are minimized, thus eliminating the appearance of a phantom target, in addition to the real target.

These and other objects of the invention are set forth with particularity in the appended claims. However, for a better understanding of the invention itself, together with further features and advantages thereof, reference is made to the accompanying description and drawings in which are shown several illustrative embodiments of the invention.

Figure 1:
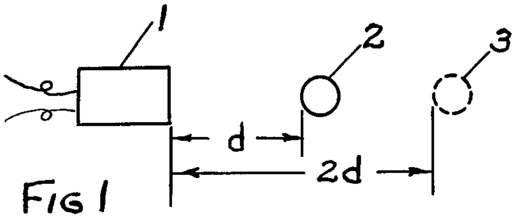
FIG. 1 is a diagram illustrating a transducer mounted with its axis of maximum sensitivity in alignment with a nearby sound reflecting target and a phantom image of the target appears at twice the real target distance from the transducer.
Figure 2:
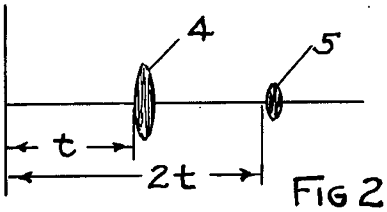
FIG. 2 is an oscillogram of the tone burst signal reflected from the target as received by the transducer in FIG. 1.

Now, referring more specifically to the figures, FIG. 1 shows an electroacoustic transducer 1 whose axis of maximum sensitivity is lined up with a sound reflecting target 2 which is located at a distance *d* from the face of the transducer. When an oscillator tone burst signal of short duration is connected to the transducer 1, an acoustic signal of similar short duration is transmitted from the transducer toward the target 2. The electrical signal may be applied to the transducer through a Transmit-Receive switch, as used in conventional echo ranging systems that are very well known in the art. The acoustic signal is reflected from the target 2 and when received by the transducer appears as shown by the pulse 4 on the oscillogram in FIG. 2. The time *t* in FIG. 2 represents the time required for the acoustic signal to travel the round trip distance *d* from transducer 1 to the reflecting target 2 and back. When the reflected acoustic signal from the target 2 returns to transducer 1, it is reflected from the face of the transducer and is returned again to the target 2 from which it is re-reflected back to the transducer 1 to cause a second received signal to appear in the oscillogram, as illustrated by the pulse 5 appearing at a time 2*t*, as illustrated in FIG. 2. This re-reflected signal corresponds to a phantom target 3 which is located at a distance 2*d* from the transducer, as illustrated in FIG. 1, and thus introduces an error in the measurement.

Figure 3:
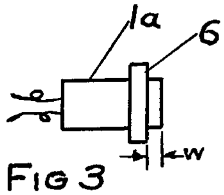
FIG. 3 shows one illustrative embodiment of a transducer design for eliminating the phantom target image present with the conventional transducer design illustrated in the echo ranging system shown in FIG. 1.
Figure 4:
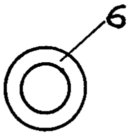
FIG. 4 shows a plan view of the structure illustrated in FIG. 3.

In order to eliminate the phantom target error from the system, the transducer design is modified, as illustrated in FIGS. 3 and 4 so that a second reflecting surface is presented to the arriving echo from the target. The second reflecting surface is represented in FIG. 3 as a flange-like ring 6 surrounding the cylindrical transducer 1*a*. The annular reflecting surface of the ring 6 is parallel to the end face of the transducer and is displaced from the transducer face by a distance W, as illustrated, If the area of the reflecting face of the ring 6 is made approximately equal to the area of the end face of the cylindrical housing and if the distance W is made approximately ¼ wavelength of the sound signal, the reflection from the ring will combine out-of-phase with the reflection from the transducer face and thereby neutralize the reflection of the received acoustic signal by the transducer, thus eliminating the phantom reflection signal 5 and the corresponding phantom target 3 previously described. This eliminates the phantom target error in the measurement and accomplishes an object of the invention. The exact area of the face of the ring 6 and the best value of distance W may be determined experimentally. The optimum values are those which achieve maximum cancellation of the re-reflected target echo from the transducer face. When the distance W is made approximately equal to ¼ wavelength of the sound at the frequency of operation, or if W is made an odd multiple of ¼ wavelength, the reflection from the face of the ring 6 will be out-of phase with the reflection from the face of the transducer, and will therefore cancel each other.

Figure 5:
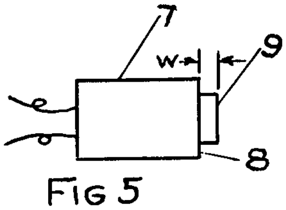
FIG. 5 shows another illustrative embodiment of a transducer design for eliminating the phantom target image.
Figure 6:
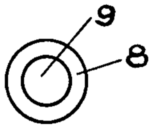
FIG. 6 shows a plan view of the structure illustrated in FIG. 5.

The illustration in FIGS. 5 and 6 shows another type of transducer construction in which the transducer 7 has an annular sound sensitive face 8 and the reflecting surface 9 is illustrated as the end of a cylinder having an area approximately equal to the area of the annular surface 8 and extending a distance W ahead of the transducer face 8. The cancellation of the transducer reflection is accomplished in the same way that the cancellation was achieved in the illustration of FIGS. 3 and 4.

The elimination of phantom target errors has been described in connection with a transducer that is used as a probe and is mounted in free space away from reflecting surfaces. When the transducer is mounted in the proximity of a reflecting surface such as a wall, the elimination of phantom targets requires the reduction of the acoustic reflection from the wall surface as well as from the transducer surface. For this type of situation, the baffle structures illustrated in FIG. 7 to 10 will be effective in minimizing the reflections from wall surfaces in the proximity of the transducer and thus achieve the desired objective of eliminating phantom target errors in the sound ranging system.

Figure 7:
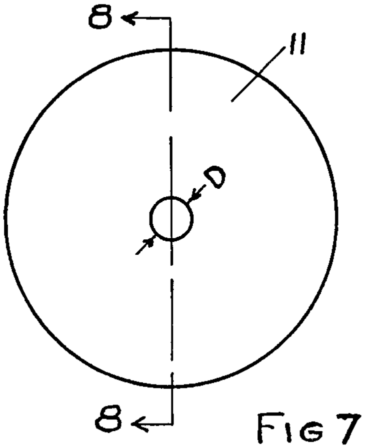
FIG. 7 is a plan view illustrating a baffle arrangement for mounting a transducer in the proximity of a wall to achieve a reduction in the level of a re-reflected acoustic signal from the wall surface in the vicinity of the transducer, thereby eliminating the phantom target error.
Figure 8:
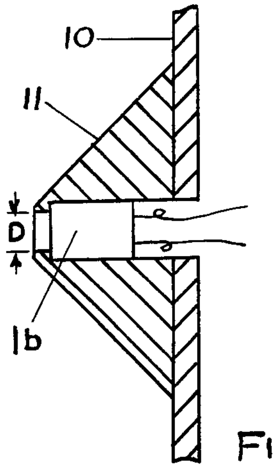
FIG. 8 is a cross-section taken along the line 8—8 of FIG. 7.

FIGS. 7 and 8 illustrate the construction of a baffle arrangement for mounting the transducer **1*b* in the vicinity of the wall 10 for reducing the magnitude of the reflection of a pulse of sound which is traveling toward the transducer along its normal axis. The baffle structure 11 has an external conical surface, as illustrated in FIG. 8. The transducer 1*b* is nested into a recessed cavity in the rear of the conical structure, as illustrated in FIG. 8. A small opening of diameter D exposes only the minimum active area of the transducer surface; therefore the reflections of the acoustic target signals which are received along the normal axis of the transducer will be minimized. The surface surrounding the small exposed area of the transducer is conical in shape, as illustrated in FIG. 8,** which serves to reflect most of the arriving target signal away from the axis of the transducer, thereby preventing the return of the reflected acoustic energy back to the target, thus preventing the second acoustic reflection from the target thereby preventing the appearance of a phantom target signal in the output of the transducer.

Figure 9:
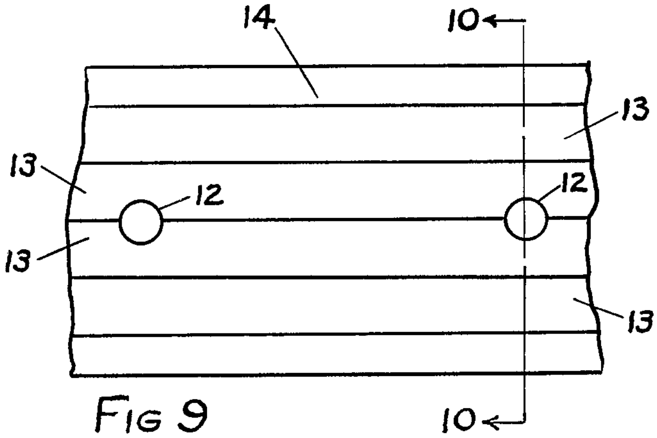
FIG. 9 is a plan view illustrating another type of baffle construction for mounting a transducer in the proximity of a wall. The baffle construction achieves a reduction in the magnitude of the re-reflected acoustic signal from the vicinity of the transducer.
Figure 10:
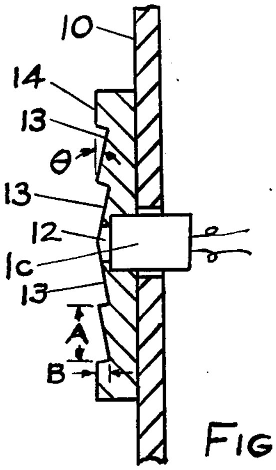
FIG. 10 is a cross-section taken along the line 10—10 of FIG. 9.

FIGS. 9 and 10 illustrate still another baffle arrangement which is especially suited for mounting an array of transducers near the surface of a reflecting wall and minimizing the reflection of acoustic signals being received from the target along axes perpendicular to the wall surface. The transducers **1*c* are mounted into recessed cavities in the rear surface of the baffle plate 14 and only the minimum active areas of the transducers are exposed through small openings 12 in the front surface of the baffle plate 14 thus achieving a similar type of mounting for the transducer 1*c*, as was achieved for the transducer 1*b* in FIG. 8. The exposed front surface of the baffle plate 14 is provided with a plurality of longitudinal strip surfaces 13 arranged in shingle-like orientation, as illustrated. If the width A of the strip surfaces 13** is made larger than a wavelength at the frequency of operation of the transducer, and if the depth of the step B in the shingle-like surface is made greater than one-half wavelength at the operating frequency, then the sound signals arriving along paths normal to the plane of the array will be reflected along axes inclined to the axis of arrival, and thus will be prevented from returning to the target, thereby eliminating the possibility of a second reflection from the target, thus eliminating the presence of a phantom target signal and accomplishing an object of this invention. I have also found it necessary to make the angle of inclination of the shingle-like strips, as shown by $\theta$ equal to or greater than one-half the beam angle of the transducer where the transducer beam angle is the total angle, as represented by the −3 dB points in the directional pattern.

An array structure built by the Applicant in accordance with the teachings of this invention, as illustrated in FIGS. 9 and 10, has been found capable of reducing the amplitude of the phantom target signal to a level approximately 20 dB below the levels of the signal received from the real target. The inventive array structure is now being successfully used in connection with an ultrasonic automatic pin scoring system because it eliminates the phantom target errors that had prevented the ultrasonic automatic scoring system from being commercially accepted prior to the correction of the problem by the teachings of this invention.

While there has been shown and described several specific illustrative embodiments of the present invention, it will, of course, be understood that various modifications and alternative constructions may be made without departing from the true spirit and scope of the invention. Therefore the appended claims are intended to cover all such modifications and alternative constructions as fall within their true spirit and scope.

I claim:

1. In combination in an electroacoustic transducer adapted for receiving sound waves from a sound reflecting target for the purpose of sensing the presence of said target, said transducer characterized in that its sound sensitive surface lies in a plane at right angles to the axis of maximum sensitivity of the transducer, a rigid sound reflecting surface located in the proximity of said sound sensitive surface, said sound reflecting surface characterized in that it also lies in a plane, said plane containing said sound reflecting surface is parallel to and displaced from the plane containing the sound sensitive surface of said transducer, the amount of displacement between said parallel planes is equal to approximately ¼ wavelength of the sound wave at the frequency of operation of the transducer, further characterized in that said transducer is housed in a right circular cylinder, and still further characterized in that the sound sensitive surface of said transducer lies in a plane at one end of said cylinder, and still further characterized in that said sound reflecting surface is an annular ring surrounding said cylinder, said ring having a plane sound reflecting surface parallel to the sound sensitive surface of said transducer 2. The invention in claim 1 further characterized in that the plane area of the said end of said cylinder is approximately equal to the area of said surrounding annular surface.

3. In combination, a directional electroacoustic transducer adaptable for use in a sound-ranging system for the detection of a sound reflecting target and elimination of multiple reflections, means for the detection of said sound reflecting target which includes the reception and recognition of an acoustic signal arriving from the target along an axis which includes the target and the directional transducer, a sound reflecting surface in the vicinity of said electroacoustic transducer, said sound reflecting surface characterized in that the linear dimensions of said sound reflecting surface are larger than the wavelength of said acoustic signal, and further characterized in that the configuration of said sound reflecting surface includes sound reflecting areas oriented in such manner that any line drawn perpendicular to the surface of any of the said sound reflecting areas from any point on the surface of said sound reflecting areas makes an angle with a line drawn parallel to the axis of the transducer from the same point on the surface of said sound reflecting area which is greater than one-half the beam angle of the transducer, the beam angle of the transducer being defined as the angle corresponding to the $-3$ dB points in the directional response characteristic of the transducer.

4. In combination, a plurality of directional electroacoustic transducers adaptable for use in a sound ranging system for the detection of sound reflecting targets, a baffle structure having a front and a rear surface, means for mounting said directional transducers within said baffle structure in a manner that exposes the sound sensitive surfaces of said transducers through the front surface of said baffle structure, said baffle structure characterized in that said front surface has a longitudinal length dimension and a vertical width dimension, said front surface of said baffle structure further characterized in that it includes a plurality of inclined shingle-like sound reflecting longitudinal strips in the vicinity of the exposed sound sensitive surfaces of said mounted transducers, the vertical width dimension of said inclined strips being greater than a wavelength of sound at the operating frequency of said transducers, and the inclination angle of the vertical surfaces of said plurality of shingle-like strips being greater than one-half the beam angle of the transducer, the beam angle of the transducer being defined as the angle corresponding to the $-3$ dB points in the directional pattern of the transducer.

5. The invention in claim 4 further characterized in that said baffle structure includes transducer mounting means for attaching the transducers to the rear surface of said baffle structure, and further characterized in that only small openings are provided through the front surface of said baffle structure sufficient in size to expose only the active area portions of the transducers.

* * * * *